Patented Jan. 10, 1939

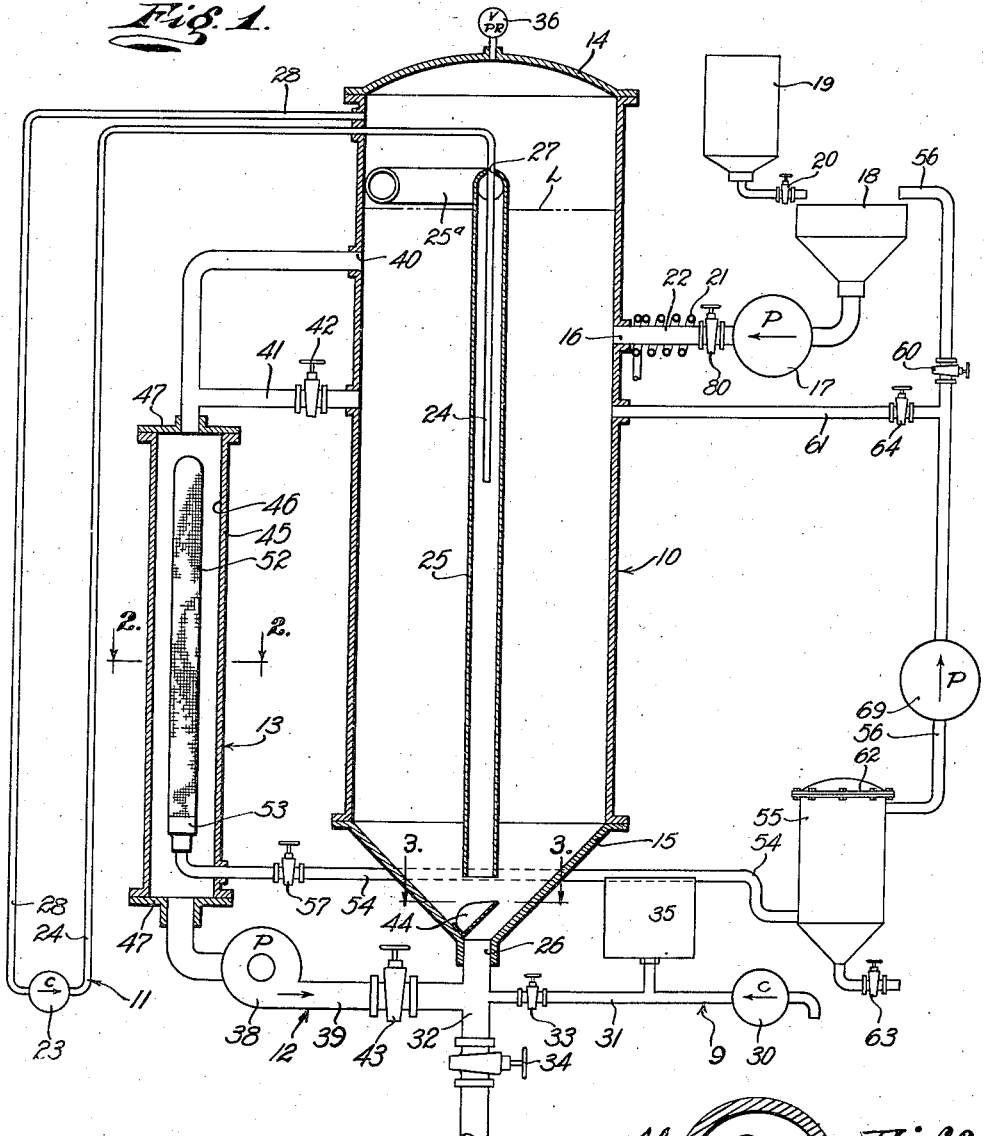
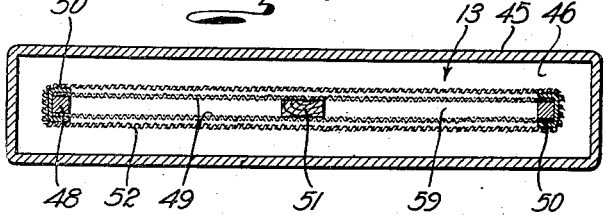

2,143,073

UNITED STATES PATENT OFFICE 2,143,073

METHOD FOR TREATING ORE

William B. Judson, Santa Monica, Calif., assignor to Jay A. Winans, Los Angeles, Calif.

Application October 10, 1936, Serial No. 105,032

10 Claims. (Cl. 75—105)

This invention relates to a method for treating ore and relates more particularly to a method for extracting gold, silver, etc. from ore pulp. A general object of the invention is to provide a very rapid, inexpensive and commercially practical method for recovering gold, silver, etc. from ore.

Another object of this invention is to provide an extracting or recovering method of the character mentioned that effects the very rapid dissolution of the gold, silver, or the like. The method of the present invention is operable to put the metal in the ore pulp in solution in approximately one hour, as compared with typical agitating methods that require thirty-six hours or more, and typical leaching methods that consume seventy-two hours or more for this function.

Another object of this invention is to provide a method for extracting metal from ore pulp that effects the maximum extraction of the metal at a minimum cost.

Another object of this invention is to provide a method of the character mentioned for treating ore pulp that does not involve or necessitate re-washing of the pulp or re-filtering of the metal bearing solution.

Another object of this invention is to provide a method for treating ore that involves the continuous circulation and agitation of the ore pulp and the metal dissolving solution while under substantially uniform super-atmospheric pressure, and the continuous filtration of the agitated circulating solution to obtain the metal bearing solution.

Another object of this invention is to provide a method of the character mentioned that involves a continuous filtration of the ore pulp and cyanide solution under a high pressure to obtain a maximum filtration output with a minimum filtering area.

Another object of this invention is to provide an ore treating method of the character mentioned that does not subject or expose the cyanide solution to excessive aeration or oxydation.

Another object of this invention is to provide an ore treating method of the character mentioned in which there is a proper, substantially uniform aeration of the ore pulp and cyanide solution with a minimum of loss of the solution due to excessive oxydation.

The various objects and features of my invention will be fully understood from the following detailed description of a typical preferred manner of carrying out the method of the invention, throughout which description reference is made to the accompanying drawing, in which:

Fig. 1 is a schematic or diagrammatic view of the apparatus employed in carrying out the method of the present invention illustrating the tank and the filter housing in vertical cross section. Fig. 2 is an enlarged horizontal detailed sectional view taken as indicated by line 2—2 on Fig. 1 and Fig. 3 is an enlarged transverse detailed sectional view of the lower portion of the tank showing the baffle in elevation, being a view taken as indicated by line 3—3 on Fig. 1.

It is believed that the method of the present invention will be best understood following a description of the apparatus employed in carrying it out. Accordingly, I will proceed with a detailed description of a typical form of the apparatus and will follow such disclosure with a description of the method of the invention as carried out in the operation of the apparatus.

The ore treating apparatus illustrated includes, generally, a container or tank 10 for receiving the ore pulp and the metal dissolving solution, means 11 for agitating the contents of the tank 10 by an air lift, means 9 for maintaining the contents of the tank 10 under super-atmospheric pressure, means 12 for circulating the ore pulp and solution while under pressure, and filter means 13 in connection with the means 12 for filtering off the metal bearing solution.

The tank 10 is provided to contain the main body or bulk of the ore pulp and the metal dissolving solution during the recovery process. The tank 10 is preferably comparatively heavy to dependably withstand the relatively high pressures to which the pulp and solution are subjected. The tank 10 is elongate, that is, its length is several times greater than its diameter. The tank 10 is upright or vertically disposed and may be cylindrical in its general configuration. The upper end of the tank 10 is closed by a suitable top 14 which is preferably domed, as illustrated. The lower end of the body 10 is closed by a bottom 15 which is preferably tapered or of inverted conical configuration. The size of capacity of the tank 10 of course depends upon the installation. The inlet 16 of the tank 10 is spaced some distance below its upper end and is adapted to receive the ore pulp and solution from a suitable pulp pump 17. As illustrated diagrammatically in Fig. 1, the pump 17 may have a hopper 18 for receiving the charge of ore pulp. A tank or reservoir 19 may be provided to contain a supply of the mineral dissolving solution or cyanide solution and may discharge into the hopper 18 under the control of a suitable valve 20. If desired or believed necessary a suitable heating coil 21 may surround the circulation pipe 39 to be subsequently described, or the pipe 22. A check valve 80 is provided in the pipe 22 to prevent a return flow through the pump 17.

The means 11 is provided to assist in maintaining a continuous agitation of the material in the tank. The means 11 includes a suitable air compressor 23 conveniently located adjacent the tank 10. The high pressure or discharge line 24 from the compressor 23 enters the upper end portion of the tank 10. The means 11 includes or provides an air lift for assisting in the agitation of the ore pulp and solution in the tank 10, and for partially aerating the pulp and solution. A tube 25 extends centrally and longitudinally through the tank 10 from a point above the liquid level L to a point a short distance from the outlet 26 of the tank. The upper portion 25ª of the tube 25 lies in a plane at right angles to the body of the tube and is tangential or curved so that the material discharging therefrom takes a generally circular course. This portion 25ª of the tube 25 is located above the normal liquid level L in the tank 10. The line 24 from the compressor 23 extends vertically downward through an opening 27 in the upper portion of the tube 25 and extends some distance downwardly in the tube. The intake line 28 of the compressor 23 communicates with the upper portion of the tank 10, above the liquid level L, as diagrammatically illustrated in Fig. 1.

When the compressor 23 is in operation the air discharging from the lower end of the pipe or line 24 creates an air lift causing an upward movement of the pulp and solution through the tube 25. This upwardly moving pulp and solution together with the air from the pipe 24 discharges from the outlet of the tube portion 25ª above the liquid level L and takes a generally circular course to cause or tend to cause the body of the material in the tank 10 to turn or rotate in the tank. The air under pressure discharging from the compressor line 24 into the tube 25 creates a continuous circulation through the tank 10. The air discharging from the pipe 24 draws or lifts the pulp and solution upwardly through the tube 25 so that the pulp and solution is continuously drawn downwardly in the tank 10 to the lower end of the tube and is continuously discharged from the upper end of the tube so that a continuous vertical circulation is maintained. The agitation and vertical circulation in the tank 10 brings the mineral bearing pulp in intimate contact with the metal dissolving solution. The air handled by the means 11 also aerates the pulp and solution to assist the dissolving action of the solution. It is to be noted, however, that the same air is continuously recirculated through the compressor 23 and the lines 24 and 28 so that the metal dissolving solution is not subjected to excessive oxydation.

The tank 10 is closed except for its connections with the circulation system of the means 12 and its upper portion contains air under a suitable relatively high pressure. In practice the interior of the tank 10 above the liquid level L may contain air under 100 pounds pressure, more or less. The compressor 23 supplies air under pressure to the line 24 at a pressure slightly greater than the pressure maintained in the tank 10 to overcome the hydrostatic head on the discharge of the line 24 and to produce a suitable agitating action. The air is supplied to the intake side of the compressor 23 under the same pressure that is maintained in the tank 10 so that the compressor is only required to develop a slight pressure, say about ten pounds, on the air which it supplies to the air lift line 24. Thus the compressor 23 connected in the closed system of the lines 24 and 28 and the tank 10 requires a minimum of power for its operation.

The means 9 is provided to aerate the pulp and solution in the tank 10, to maintain the proper pressure in the system and to assist in initiating the operation of the apparatus. The means 9 may comprise a suitable compressor 30 receiving its air supply from the atmosphere and discharging into a line 31 which is connected with the drain pipe 32 of the tank 10. A suitable valve 33 controls the air line 31. A valve 34 is provided in the drain pipe 32 below the line 31. The valve 34 is closed during the operation of the apparatus. A receiver or pressure accumulator 35 is connected in the air line 31. The compressor 30 delivering air under pressure to the line 31 is operable to supply the air under pressure to the lower end of the tank 10 to aerate the contents of the tank and to increase or maintain the pressure in the tank. An automatic pressure relief valve 36 is provided on the top 14 of the tank 10 to prevent the development of excess pressure in the tank. The compressor 30 and the valve 33 are under the control of the operator and the compressor may be operated from time to time to aerate the contents of the tank 10 and to build up pressure in the tank. When the operation of the apparatus is started or is resumed following a shut down, the compressor 30 may be put into operation to assist in starting a vertical circulation and agitation in the tank 10.

The means 12 operates to continuously circulate the ore pulp and solution from the upper portion of the tank 10 to the lower portion of the tank to thoroughly agitate the pulp and solution and to bring the circulating pulp and solution under pressure to the filter means 13. The means 12 includes a pump 38 interposed in a circulation line 39. The pump 38 is preferably of the centrifugal type as diagrammatically illustrated in the drawing. The circulation line 39 has its receiving end 40 in communication with the upper portion of the tank 10 below the liquid level L and preferably has its discharge end connected with the drain 32 about the valve 34. In practice the circulation line 39 may have one or more branch inlets 41 communicating with the interior of the tank 10 below its upper inlet 40. The branch or branches 41 may be governed by suitable valves 42 and may be optionally employed as conditions require. A valve 43 controls communication between the circulation line 39 and the drain pipe 32. A curved baffle 44 is preferably provided in the bottom 15 of the tank 10 above its discharge 26. The baffle 44, best illustrated in Fig. 3, is shaped to give a rotary motion to the pulp and solution under pressure pumped upwardly through the discharge 26 by the pump 38 and to deflect the air under pressure from the compressor 30 from the end of the tube 25. It will be observed that the liquid is supplied to the pump 38 under the high pressure maintained in the tank 10 so that the pump is only required to increase the pressure on the liquid to maintain the proper circulation of liquid and to provide the desirable agitation in the tank 10. The pump 38 thus operating in a closed pressure system is economical to operate. It is believed that it will be apparent how the pump 38 is operable to continuously circulate the agitated ore pulp and solution through the line 39 between vertically spaced portions of the tank 10 to maintain the contents of the tank in agitation.

The filter means 13 is interposed in the circulation line 39 to filter off the metal bearing solution. The filtering means 13 includes a manifold or housing 45 connected in the circulation line 39. In the particular structure illustrated in the drawing the housing 45 is connected in the line 39 between the pump 38 and the inlets 40 and 41, it being obvious that the housing may be connected in the line between the pump 38 and the drain pipe 32 of the tank 10. The housing 45 is hollow to provide a chamber 46 which passes the pulp and solution flowing through the line 39. The housing 45 is vertically disposed and is preferably elongate in horizontal cross section, as illustrated in Fig. 2. The line 39 carrying the pulp and solution communicates with the upper and lower ends of the chamber 46 so that the pulp and solution flows vertically or longitudinally through the chamber 46. In accordance with the invention the interior of the housing 45 is readily accessible. In practice the opposite ends 47 of the housing 45 may be removable to give access to the chamber 46.

The filter means 13 includes one or more filter units. The number of filter units depends upon the character of the ore pulp, the capacity of the tank 10 and the rate of flow through the circulation line 39. Each filter unit includes a frame 48 of wood or the like. The filter frame 48 may be of any suitable shape but is preferably rectangular and is proportioned to have its sides and ends spaced from the adjacent walls of the chamber 46. The open sides of the frame 48 are covered with laid wire cloth or screening 49. The screening 49 is laid against and secured to the vertical sides of the frame 48 so that a chamber or space 59 is maintained within the filter. In practice metal strips 50 may be employed to secure the screening 49 to the frame 48. One or more strips 51 of wood or the like extend longitudinally through the interior of the filter frame 48 to hold the screening parts in spaced relation. The frame 48 is vertically or longitudinally disposed in the housing 45 so that the screening 49 is substantially vertical or in parallel relation with the flow through the chamber 46.

A bag 52 of heavy canvas, or the like, extends around the frame 48 to engage about the exterior of the screening 49. In the arrangement illustrated the bag 52 is inverted and its lower end is closed by being secured to a manifold or header 53 at the lower end of the filter frame 48. A receiver pipe 54 carries the metal bearing solution from the header 53. The pipe 54 may carry the metal bearing solution directly to precipitation boxes 55 as diagramatically illustrated in the drawing. The metal bearing solution filtered through the bag 52 and the screening 49 does not require washing or refiltering before being delivered to the precipitation box 55. The metal in the solution is precipitated in the box 55. The remaining or resultant barren solution flows from the box 55 through a pipe 56. The pipe 56 may extend to the hopper 18 of the pump 17, as illustrated. The pipe 56 is provided with a branch 61 which has communication with the upper portion of the tank 10. A valve 60 is provided in the pipe 56 between its upper end and the branch pipe 61 and a valve 64 is provided in the branch pipe 61. A high pressure pump 69 is connected in the pipe 56 to pump the barren solution back into the tank 10. In accordance with the invention the pump 69 is of greater capacity than the inflow to the precipitation box 55 so that a reduced pressure or vacuum is created in the box. The precipitation box 55 is vertical and the metal bearing solution enters its lower end portion from the pipe 54 and is drawn out at its top through the pipe 56 by the pump 59. The precipitation box 55 illustrated has a removable normally air tight head 62 and a suitable discharge valve 63 at its lower end. During a substantial period of the operation the barren cyanide solution is returned to the tank 10 for re-use. Fresh cyanide may be supplied to the hopper 18 from time to time to compensate for the cyanide solution used or lost during the process. A suitable valve 57 is connected in the pipe 54 to control the filter or filter units of the means 13.

The method of the present invention as carried out with the apparatus described above is as follows: A charge of ore pulp and cyanide solution or metal dissolving solution of the proper strength is supplied to the tank 10 by the pump 17. The drain valve 34 and valve 43 are closed when the charge is supplied to the tank 10. The compressor 30 is put into operation and the relief valve 36 is open. A sufficient air space is left in the upper portion of the tank 10 to form a pressure accumulator or regulator. If desired or necessary the solution and pulp may be heated as it flows through the inlet pipe 22 or through the circulation pipe 39. The desired pressure may be built up in the tank 10 by the compressor 30 when the relief valve 36 is closed. The agitation of the material in the tank 10 is then started. The pump 38 is put into operation to circulate the pulp and solution vertically through the tank 10. The compressor 23 is put into operation to produce the air lift through the tube 25. The compressor 30 may also be operated to assist in raising and agitating the heavy constituents of the pulp which may settle in the tank 10.

When a proper or selected air pressure is built up in the tank 10 and when the material is in full agitation the compressor 30 may be shut down and the filter valve 57 may be opened. As the pipe 54 from the filter header 53 discharges into the precipitation box 55 at or below atmospheric pressure, the heavy pressure maintained on the pulp and solution in the tank 10 and the circulation line 39 causes the metal bearing solution to be forced through the filter bag 52 and the screening 49 of the filter. Thus clear metal bearing solution is received in the pipe 54 and is discharged into the box 55 where the metal is precipitated. The barren metal dissolving solution passes through the pipe 56 to the pump 69. The pump 69 pumps the barren solution through the pipe 56 and its branch 61 back into the tank 10 thus maintaining the proper ratio between the pulp and solution in the tank.

It is important to note that the pulp and solution are continuously agitated while under pressure. The air lift produced by the air under pressure discharged by the line 24 into the tube 25 creates a continuous vertical circulation in the tank 10 and the pulp and solution discharging from the tangential upper portion 25ª of the tube may create a circular or rotary motion in the tank. The pump 38 continuously circulates the pulp and solution through the line 39 so that the pulp and solution is circulated between vertically spaced portions of the tank 10 to maintain a complete agitation of the material. The pressure is maintained by the compressor 30 when the pressure drops. The baffle 44 gives the pulp and solution entering the lower end of the tank 10 a rotary or circular motion so that the contents of the tank continuously turn to hold pulp in suspension.

The frame 48 of the filter is vertically or axially disposed in the chamber 46 so that the sides of the bag 52 are disposed in parallelism with the direction of flow through the chamber 46. This disposition of the filter provides for the scouring and washing of the bag 52 by the fluid and the sand particles in the fluid as it flows through the chamber 46. This action prevents the filter from becoming clogged or choked with slime. The interior of the filter being in communication with a vacuum or reduced pressure through the pipe 54 admits the metal bearing solution under pressure through the bag 52 and the screening 49. It is important to note that the metal bearing solution received by the filter is under pressure and flowing through the chamber 46. The filter thus operates to receive or filter off the metal bearing solution under pressure as it flows around the filter. The filter does not require manual handling or manipulation at any time during the process. The bag 52 may be readily replaced when desired and the filter or its screening 49 may be replaced or repaired from time to time.

The above described operation of the apparatus may continue until there has been a complete or substantially complete recovery of the metal from the ore pulp. The pump 38 and the compressor 23 may then be shut down and the valves 57 and 43 may be closed. The drain valve 34 is then opened to permit the tailings to discharge from the tank 10. When the tank has been emptied the apparatus is adapted to receive another charge of the ore pulp and solution and the above described operation may be repeated. The tailings may be washed and the washing water placed in the reservoir 19 thus avoiding loss of metal in solution in the tailings.

Having described only a typical preferred manner of carrying out the method of my invention, I do not wish to be limited or restricted to the specific details herein set forth, but wish to reserve to myself any variations or modifications that may appear to those skilled in the art or fall within the scope of the following claims.

Having described my invention, I claim:

1. The method of treating ore pulp comprising, maintaining a body of the pulp in suspension in a metal dissolving solution under pressure by agitation in a container, circulating the pulp and solution between the upper and lower portions of said body during agitation of the pulp and solution by forcing the same through a closed conduit circuit whose ends communicate with the upper and lower portions of the container, and filtering off the metal bearing solution from the pulp and solution thus circulating through said circuit.

2. The method of treating ore pulp comprising, maintaining a body of the pulp in suspension in a metal dissolving solution under pressure in a container, pumping the pulp and solution from said container and back into the container to agitate the said body, and filtering the metal bearing solution from the pulp and solution thus being circulated to and from the container.

3. The method of treating ore pulp including, maintaining a body of pulp in suspension in a metal dissolving solution under super-atmospheric pressure in a closed container, agitating said body by an air lift while under such pressure, and circulating the pulp and solution from the upper portion of said body to the lower portion of said body to agitate the same by forcing the pulp and solution through a conduit whose ends communicate with the upper and lower portions of the container.

4. The method of recovering metal from ore pulp comprising, maintaining a body of ore pulp and a metal dissolving solution under super-atmospheric pressure in a container, circulating a stream of the pulp and solution from said body and back into said body under pressure by forcing it through a conduit whose ends communicate with the container, filtering metal bearing solution from said stream, subjecting the metal bearing solution thus filtered to a metal precipitation process and continuously returning the barren solution to the container.

5. The method of recovering metal from ore pulp comprising, maintaining a body of ore pulp and a metal dissolving solution under super-atmospheric pressure in a container, agitating said body by circulating a stream of the pulp and solution from said body and back into said body under pressure by forcing the same through a conduit receiving the pulp and solution from the container and discharging into the lower portion of the conduit, filtering metal bearing solution from said stream flowing through said conduit, and subjecting the metal bearing solution thus filtered to a metal precipitation process.

6. The method of recovering metal from ore pulp comprising, maintaining a body of ore pulp and a metal dissolving solution under super-atmospheric pressure in a container, agitating and aerating said body, circulating a stream of pulp and solution from said body and back into said body in the container while the body is being agitated and aerated, filtering the metal bearing solution from said stream while the same is circulating to and from the container, subjecting the metal bearing solution thus filtered to a metal precipitation process, and returning the barren solution to said body in the container as the process continues.

7. The method of treating ore pulp including, maintaining a body of pulp in suspension in a metal dissolving solution under super-atmospheric pressure in a closed container, agitating said body by an air lift while under pressure, and further agitating said body while under pressure by continuously circulating a stream of the pulp and solution from said body and back into said body under pressure.

8. The single stage closed circulatory system of treating ore pulp comprising maintaining a body of ore pulp and a metal dissolving solution in a state of agitation under super-atmospheric pressure in a container, continuously circulating a stream of the pulp and solution from the said body and back into the said body while the body is agitated and under pressure by forcing the same through a closed conduit circuit whose ends communicate with the container, filtering off metal bearing solution from said stream and precipitating the metal therefrom by drawing the metal bearing solution from said stream through a filtering and precipitating circuit maintained under a pressure less than that on said body, and returning the barren solution to the container from the filtering and precipitating circuit.

9. The single stage closed circulatory system of treating ore pulp comprising maintaining a body of ore pulp and a metal dissolving solution in a state of agitation under super-atmospheric pressure in a container, continuously circulating a stream of the pulp and solution from the said body and back into the said body while the body is agitated and under pressure by forcing the same through a closed conduit whose ends communicate with the container, filtering off metal bearing solution from said stream and precipitating the metal therefrom by drawing the metal bearing solution from said stream through a filtering and precipitating circuit maintained under a pressure less than that on said body, continuously returning the barren metal dissolving solution from the filtering and precipitating circuit to the said body in the container, and maintaining a given pressure relation between the said body and the filtering and precipitating circuit.

10. The method of treating ore pulp including maintaining a body of ore pulp and metal dissolving solution under pressure in a closed container, and agitating said body by forcing a stream of the pulp and solution through a closed conduit circuit receiving the pulp and solution from the upper portion of said body and discharging into the lower portion of the container and directing the discharged stream in a manner to cause rotation of said body.

WILLIAM B. JUDSON.

CERTIFICATE OF CORRECTION.

Patent No. 2,143,073.  January 10, 1939.

WILLIAM B. JUDSON.

It is hereby certified that the name of the assignee in the above numbered patent was erroneously written and printed as "Jay A. Winans" whereas said name should have been written and printed as Joy A. Winans, of Los Angeles, California, as shown by the record of assignments in this office; and that the said Letters Patent should be read with this correction therein that the same may conform to the record of the case in the Patent Office.

Signed and sealed this 28th day of March, A. D. 1939.

Henry Van Arsdale.

(Seal)  Acting Commissioner of Patents.